United States Patent
Ueda

(10) Patent No.: US 7,993,790 B2
(45) Date of Patent: Aug. 9, 2011

(54) FUEL CELL WITH STACKED FUEL CELL UNITS, SPACE HOLDING MEMBER, AND FASTENING MEMBER

(75) Inventor: Kazuyuki Ueda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/858,148

(22) Filed: Aug. 17, 2010

(65) Prior Publication Data

US 2010/0310963 A1   Dec. 9, 2010

Related U.S. Application Data

(62) Division of application No. 11/683,798, filed on Mar. 8, 2007, now abandoned.

(30) Foreign Application Priority Data

Mar. 28, 2006   (JP) .................................. 2006-089248

(51) Int. Cl.
*H01M 2/00*   (2006.01)
*H01M 8/24*   (2006.01)
(52) U.S. Cl. .......................... 429/458; 429/452; 429/454
(58) Field of Classification Search .......................... None
See application file for complete search history.

(56) References Cited

U.S. PATENT DOCUMENTS

| | | | |
|---|---|---|---|
| 5,484,666 A | 1/1996 | Gibb et al. | |
| 6,066,409 A | 5/2000 | Ronne et al. | |
| 6,194,095 B1 | 2/2001 | Hockaday | |
| 6,344,290 B1 * | 2/2002 | Bossel | 429/456 |
| 6,960,402 B2 | 11/2005 | Yazici et al. | |
| 7,118,823 B2 | 10/2006 | Kato et al. | |
| 2003/0180600 A1* | 9/2003 | Naruse et al. | 429/38 |
| 2006/0019145 A1 | 1/2006 | Mogi et al. | |

FOREIGN PATENT DOCUMENTS

| | | |
|---|---|---|
| JP | 2000-123857 A | 4/2000 |
| JP | 2000-285934 A | 10/2000 |
| JP | 2004-171967 A | 6/2004 |
| JP | 2004-536438 A | 12/2004 |

* cited by examiner

*Primary Examiner* — Robert Hodge
(74) *Attorney, Agent, or Firm* — Fitzpatrick, Cella, Harper & Scinto

(57) ABSTRACT

A fuel cell, which can increase a ratio of an area of a power generation region to an area of a fuel cell unit to increase power per unit volume and unit weight of a fuel cell. The fuel cell includes an oxidizer electrode surrounding member provided at four corners of the fuel cell unit to incorporate atmospheric oxygen through an oxidizer intake formed at a gap of the oxidizer electrode surrounding member. The fuel cell further includes a through-hole which serves as a hydrogen gas supply path for each fuel cell unit and fastens the fuel cell units in a stacking direction formed inside the oxidizer electrode surrounding member. By aligning through-holes of end plates, separator, and fuel electrode seals with each other and by allowing a stack fastening component to penetrate through the through-holes, the whole is pressed and urged to be assembled.

3 Claims, 4 Drawing Sheets

FUEL CELL WITH STACKED FUEL CELL UNITS, SPACE HOLDING MEMBER, AND FASTENING MEMBER

CROSS-REFERENCE TO RELATED APPLICATIONS

This application is a division of application Ser. No. 11/683,798, filed Mar. 8, 2007, which claims the benefit of Japanese Patent Application No. 2006-089248, filed Mar. 28, 2006. Both prior applications are incorporated herein by reference in their entireties.

BACKGROUND OF THE INVENTION

1. Field of the Invention

The present invention relates to a fuel cell which performs an electrochemical reaction between gaseous fuel and oxygen in the atmosphere by using a polymer electrolyte layer.

2. Related Background Art

A fuel cell has been put into practical use which is obtained by stacking fuel cell units in which an electrochemical reaction between hydrogen gas and oxygen in the atmosphere is performed by using a polymer electrolyte membrane formed of a carbon fluoride polymer carrying a sulfonic group.

Japanese Patent Application Laid-Open Nos. 2000-285934 and 2004-171967 each disclose a technique of forming such a fuel cell formed by stacking a number of fuel cell units.

Japanese Patent Application Laid-Open No. 2004-536438 discloses a technique of distributing and supplying hydrogen gas as a fuel.

In the fuel cell disclosed in Japanese Patent Application Laid-Open No. 2000-285934, a sealing structure surrounding a through-hole exclusively for supplying hydrogen gas and a through-hole extending across an oxidizer supply space reduces a ratio of an area of a power generation region to an area of a fuel cell unit. A region exclusively for fastening disposed outside a hydrogen gas supply space and a region exclusively for supplying hydrogen gas disposed inside the hydrogen gas supply space reduce the area of the power generation region in which the hydrogen gas supply space and the oxidizer supply space oppose each other through a polymer electrolyte membrane.

Therefore, only a small power generation region can be obtained in comparison with the area of the whole of the fuel cell unit, so that the output per unit volume, unit weight, and unit production cost of a fuel cell obtained by stacking the fuel cell units is small.

The fuel cell disclosed in Japanese Patent Application Laid-Open No. 2004-171967 requires provision of a sealing structure for a hydrogen gas supply path in a position distant from a sealing structure provided outside a fuel supply space. Therefore, the number of seals and spacers for isolating the hydrogen gas supply space from the atmosphere increases, and the sealed length also increases, thereby reducing the reliability of the sealing. Further, because the alignment of the planes of the fuel cell units is performed by use of a single fastening member (through bolt) at the center while securing a supply path of a fuel to be supplied to the fuel supply space, a thick fastening member having a complex structure, that is, an expensive fastening member is required. The thick fastening member increases the area of the through-hole to reduce the ratio of the area of the power generation region to the area of the fuel cell unit.

In the fuel cell disclosed in Japanese Patent Application Laid-Open No. 2004-536438, because a fastening structure of a fuel cell unit is disposed outside the fuel cell unit, the number of components increases compared with those of Japanese Patent Application Laid-Open Nos. 2000-285934 and 2004-171967. The ratio of the area of the power generation region to the area of the fuel cell unit including the fastening structure is further reduced.

In view of such circumstances, there is a need for a fuel cell which can increase the ratio of the area of a power generation region to the area of a fuel cell unit to increase output per unit volume and unit weight of the fuel cell. Further, there is also a need for a fuel cell which can increase output per unit production cost and can be produced with a small number of components without requiring highly precise assembly.

SUMMARY OF THE INVENTION

The present invention provides a fuel cell which includes fuel cell units each having disposed in a stacking direction a fuel supply space disposed on one side of a polymer electrolyte layer and isolated from the atmosphere, and an oxidizer supply space disposed on another side of the polymer electrolyte layer and communicating with the atmosphere; a spacing holding member for supporting a thickness of the oxidizer supply space at a position outside a power generation region of the polymer electrolyte layer and having, inside thereof, a through-hole in the stacking direction; and a fastening member disposed in the through-hole, for pressing and urging the fuel supply space and the oxidizer supply space in the stacking direction, wherein at least one pair of through-holes isolated from the atmosphere and communicating with the fuel supply space are disposed at planar positions having the power generation region located therebetween.

According to the fuel cell of the present invention, because through-holes for fastening the fuel cell units and assembling a fuel cell stack can be used as a fuel supply path for each fuel supply space, it is not necessary to provide an independent fuel supply path inside or outside the fuel supply space.

Further, because the through-holes are disposed with the power generation region (i.e., planar region in which the fuel supply space and the oxidizer supply space oppose each other through a polymer electrolyte layer) being located therebetween, a fuel supply space side through-hole communicating with the through-hole of the spacing holding member can be formed in an outer wall which isolates the power generation region from the atmosphere. By allowing the outer wall to bear the pressure, the fuel cell units can be strongly fastened without applying unnecessary pressure to a hollow part of the fuel supply space. Since the fuel cell units are fastened through the dual support system by a pair of fastening members with the power generation region being located therebetween, good pressure resistance and sealing property can be imparted to the fuel supply space even with small fastening force, thin outer wall of the fuel supply space, and small bending strength of the fuel cell unit.

By forming the fuel supply space-side through-hole in the outer wall of the fuel supply space, a sealing structure of the outer wall of the fuel supply space and a sealing structure of the fuel supply space-side through-hole can easily be connected to be integrated with each other.

Therefore, the ratio of the area of the power generation region to the area of the fuel cell unit including the fuel supply path and the fuel cell unit fastening structure can be made larger than those of structures disclosed in Japanese Patent Application Laid-Open Nos. 2000-285934 and 2004-171967.

Accordingly, a fuel cell with assured large power generation region, high strength, high power, and high power stability can be realized with small amounts of materials, easy processing of components, small number of components, low assembly precision, and small area. Thereby, a small, light-weight, inexpensive, and high quality fuel cell can be provided.

Further features of the present invention will become apparent from the following description of exemplary embodiments with reference to the attached drawings.

DESCRIPTION OF THE EMBODIMENTS

In the following, a fuel cell using fuel cell units according to an embodiment of the present invention will be described in detail with reference to the drawings. The fuel cell of the present invention is not limited to have a restrictive structure described below but can also be realized in another embodiment in which the structure thereof is replaced partially or entirely by some other structure as long as a gaseous fuel is supplied through through-holes in which fastening members are disposed.

In the embodiments of the present invention, power generation is conducted by using hydrogen gas stored in a fuel tank. However, a liquid fuel such as methanol containing hydrogen atoms may be stored in a fuel tank and a required amount thereof may be constantly subjected to a reforming reaction into hydrogen gas for supply to a fuel supply space of a fuel cell unit. The fuel cell may be embodied as a power generation unit which receives hydrogen gas supplied from an external gas cylinder or the like through a pipe.

The fuel cell apparatus according to the embodiments of the present invention may be used as an independent unit detachably installed in portable electronic devices such as a digital camcorder, a projector, a printer, and a notebook personal computer. Further, a power generation part alone of a fuel cell may be integrally incorporated into a fuel cell-installed device employing a detachable fuel tank. The fuel cell apparatus may also be used for not only in applications in which the fuel cell apparatus is incorporated into an electronic device, but also for a private power generator, a residential power generator, and the like.

Embodiment 1

Figure 1:
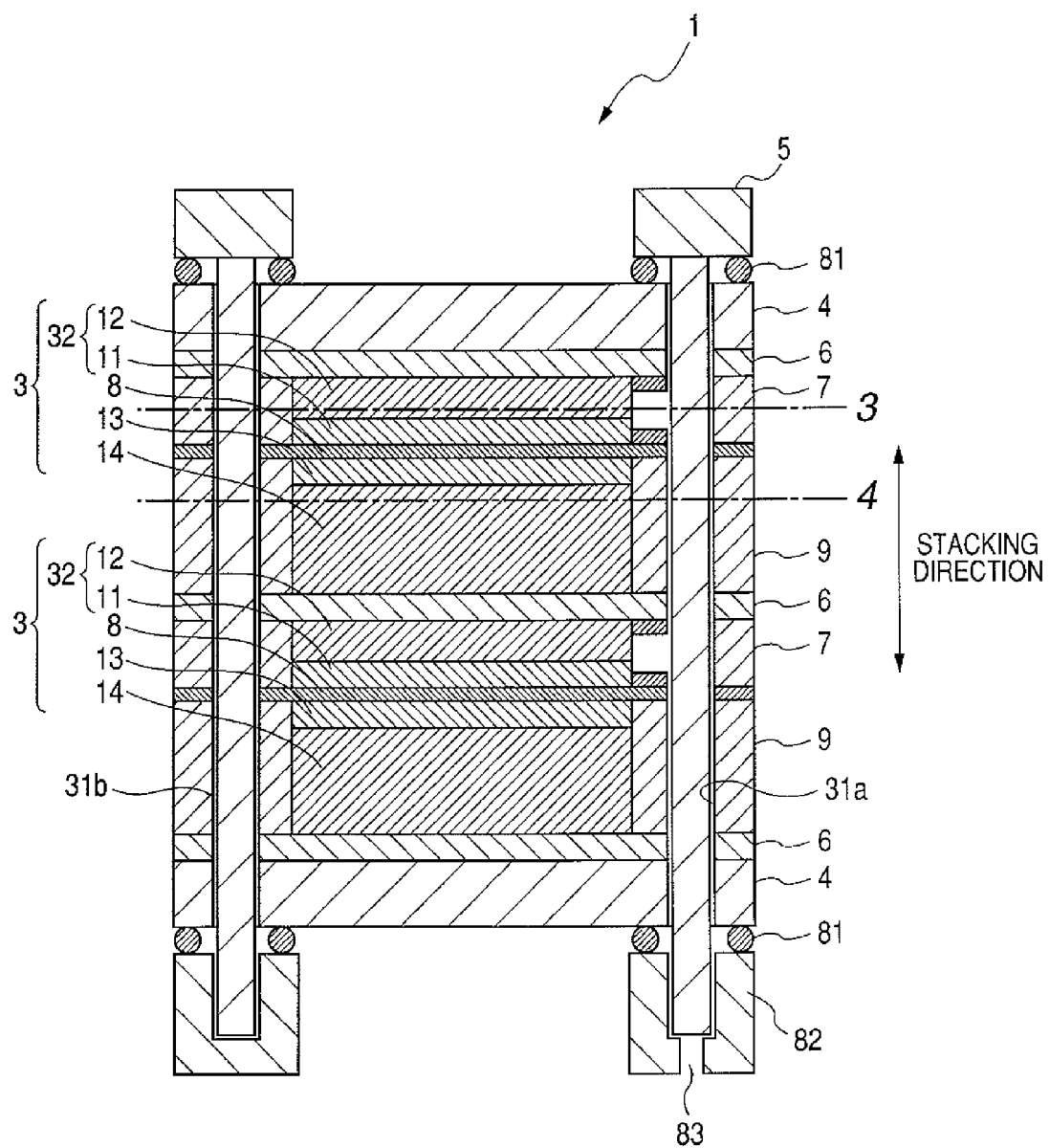
FIG. 1 is a schematic cross-sectional view illustrating the structure of a fuel cell according to Embodiment 1 of the present invention.
Figure 2:
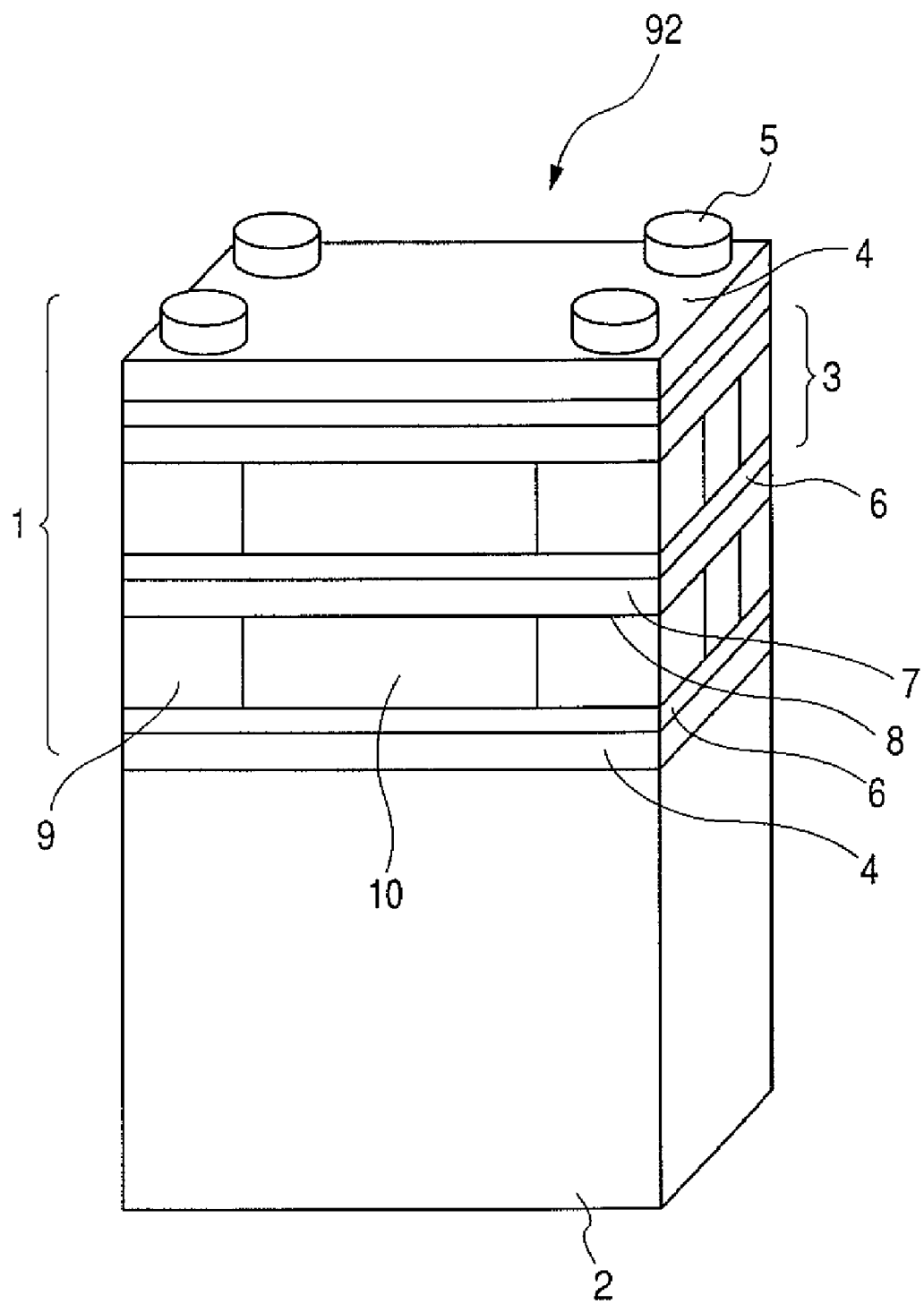
FIG. 2 is a schematic perspective view illustrating the appearance of the fuel cell according to Embodiment 1 of the present invention.
Figure 3:
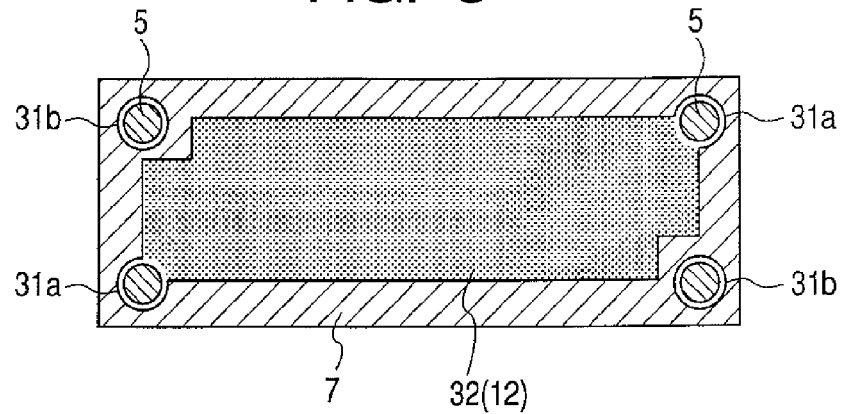
FIG. 3 is a schematic horizontal cross-sectional view of a fuel electrode of the fuel cell according to Embodiment 1 of the present invention.
Figure 4:
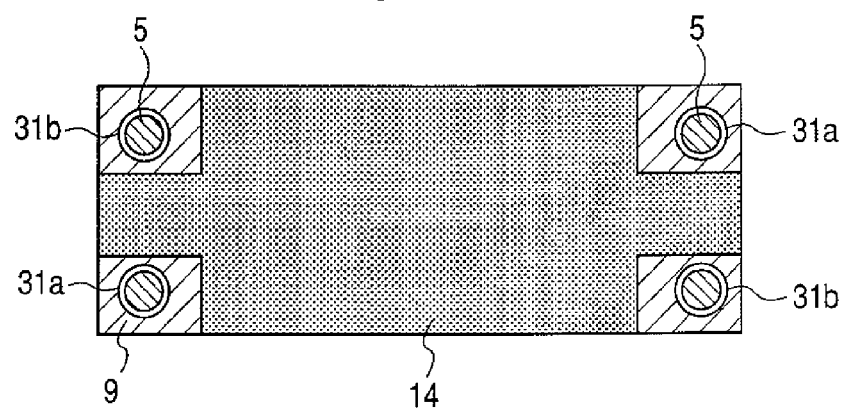
FIG. 4 is a schematic horizontal cross-sectional view of an oxidizer electrode of the fuel cell according to Embodiment 1 of the present invention.

FIG. 1 is a schematic cross-sectional view illustrating a structure of a fuel cell according to Embodiment 1 of the present invention. FIG. 2 is a schematic perspective view of the appearance of the fuel cell according to Embodiment 1 of the present invention. FIG. 3 is a schematic horizontal cross-sectional view of a fuel electrode, and FIG. 4 is a schematic horizontal cross-sectional view of an oxidizer electrode. FIG. 3 is a cross-sectional view taken along dashed line 3 in FIG. 1, and FIG. 4 is a cross-sectional view taken along dashed line 4 in FIG. 1.

As shown in FIG. 1, a fuel cell stack 1 is formed by stacking a plurality of fuel cell units 3. The fuel cell units 3 each have a structure in which a fuel electrode-side catalyst layer 11, a fuel diffusion layer 12, an oxidizer electrode-side catalyst layer 13, and an oxidizer diffusion layer 14 are stacked to sandwich a polymer electrolyte membrane 8. The fuel electrode-side catalyst layer 11 and the fuel diffusion layer 12 as a fuel supply space forming member together form a fuel electrode chamber 32 and the periphery thereof is surrounded by a fuel electrode seal 7 for sealing to prevent leakage of the fuel. At the peripheral part of the oxidizer electrode-side catalyst layer 13 and an oxidizer supply space forming member 14, an oxidizer electrode surrounding member 9 is provided. The oxidizer electrode surrounding member 9 is in contact with the polymer electrolyte membrane 8 in a non-power generation region and serves as a spacing holding member defining the thicknesses of the oxidizer electrode-side catalyst layer 13 and the oxidizer diffusion layer 14 against fastening force applied to the fuel cell stack. In the present embodiment, since oxygen in the atmosphere is taken in and used as an oxidizer, an oxidizer intake 10 (FIG. 2) is provided on the oxidizer electrode surrounding member 9 so as to be exposed to the atmosphere. Plate-like separators 6 are each provided between the fuel cell units 3 and on the both ends of the stack. An end plate 4 is in contact with each end of the stack of the fuel cell units 3 with through-holes 31a and 31b of fuel cell units being in communication with each other, respectively. A stack fastening component 5 is inserted into a through-hole which penetrates the end plate 4 on each end and the fuel cell units 3. The stack fastening component 5 presses the end plates 4 on the both ends of the stack to bring the respective members constituting the fuel cell stack 1 into close contact with each other.

As the stack fastening component 5, any member may be used as long as it can exert required fastening force. In the present embodiment, a through screw formed of SUS304 and having a diameter of 3 mm is used.

In a case where the stack fastening component 5 is formed of a conductive material, it is screwed into female screw holes of the end plates 4 formed of an insulating material or is allowed to penetrate through the end plates 4 formed of a conductive material and then screwed into a nut 82 formed of an insulating material. In a case where the stack fastening member 5 is formed of an insulating material or a conductive material coated with an insulating material, a conductive material may be used for the end plates 4 or the nut 82.

In this way, pressing force can be applied between the end plates 4 on the both sides without causing short circuiting between the both ends of the fuel cell stack 1. The thread groove of the stack fastening component 5 is not required for a part inserted into the through-holes 31a and 31b, and only need to be formed in parts to be screwed into. O-rings 81 are each placed between the stack fastening component 5 and the end plate 4 and between the nut 82 and the end plate 4, to thereby minimize leakage of the fuel.

A fuel supply flow hole 83 may be provided in the nut 82 to be disposed in a position corresponding to the through-hole 31a. Although the engagement between the nut 82 and the stack fastening component 5 is performed with a thread ridge and a thread groove, the nut 82 and the stack fastening component 5 are not completely sealed with a normal design, and a gap causing no trouble for fuel flow remains therebetween. Further, a notch may be formed on the thread ridge as described in Embodiment 3 below, to thereby expand a space for fuel flow while assuring the fastening force of the stack.

The nut 82 may also be provided with a connector function with a fuel supply source or a valve function for controlling a fuel flow rate, from the viewpoint of efficient use of space.

The fuel supply flow hole 83 may be provided in a part other than the nut 82. For example, the fuel supply flow hole 83 may be formed in a surface of the end plate 4, and the through-hole 31a and the flow hole 83 may be brought into communication with each other through a communicating hole provided inside the end plate 4.

Further, one of the pair of through-holes 31a disposed with the power generation region therebetween may be used as an inflow path, and the other through-hole 31a on the opposite side may be used as a discharge path.

In a case where the fuel cell stack 1 is used as a so-called dead-ended fuel cell in which normally, only consumed fuel gas is replenished without performing discharge, a valve is provided to the nut 82 which is disposed in a position corresponding to the through-hole 31 on a discharge side and the valve is controlled to open only for discharge of impurities.

Further, it is needless to say that the fuel cell stack 1 may be used as a flow type fuel cell in which a fuel gas is allowed to constantly flow and a fuel component in flown out gas is recycled.

As the material for the fuel diffusion layer 12 and the oxidizer diffusion layer 14 used for the fuel cell unit 3, there is advantageously used a sheet material which has porosity, has a property of permeating reaction products, and has conductivity. Examples of such a material include: a single member such as carbon cloth, carbon paper, or foamed metal; and a composite member thereof.

In the present embodiment, a porous part of each of the fuel diffusion layer 12 and the oxidizer diffusion layer 14 which have porosity constitutes substantially the whole of each of the fuel supply space and the oxidizer supply space. However, the present invention is not limited thereto. For example, an air chamber which is in communication with a diffusion layer formed of a porous material may be provided to further improve the uniformity of the supply of the fuel or the oxidizer. In such a case, a space including the porous part of the fuel diffusion layer 12 or the oxidizer diffusion layer 14 and such an air chamber combined constitutes the fuel supply space or the oxidizer supply space.

As the material used for the separator 6, any material having both high strength and conductivity may be used. A preferred example of such a material is stainless steel such as SUS304. Further, the surface roughness Ra thereof is preferably 10 μm or less, but is not limited thereto. The thickness of the separator 6 is determined so as to ensure a required strength. In the present embodiment, the material is SUS304, and the thickness is 3 mm.

As the material used for the fuel electrode seal 7, any material which has a sealing property and withstands a maximum temperature (about 120° C.) during operation of the fuel cell may be used. Preferred examples thereof include glass fiber cloth coated with polytetrafluoroethylene, fluorine rubber, and butadiene rubber. The thickness of the fuel electrode seal 7 is determined so as to be substantially equal to the thicknesses of the fuel diffusion layer 12 and the fuel electrode-side catalyst layer in the state in which the fastening force is applied. In the present embodiment, the material is butadiene rubber, and the thickness is 3 mm.

A preferred example of the material for the polymer electrolyte membrane 8 is a perfluorosulfonic acid-based polymer. In the present embodiment, a Nafion (registered trademark of DuPont) film having a thickness of 25 μm is used.

As the catalyst for the fuel electrode-side catalyst layer 11 and the oxidizer electrode-side catalyst layer 13, there is preferably used a substance which has catalyst fine particles formed of platinum carried on surfaces of carbon black fine particles. This substance is dispersed in a solution of a polymer electrolyte, and the dispersion is applied to the polymer electrolyte membrane 8, to thereby form the fuel electrode-side catalyst layer 11 and the oxidizer electrode-side catalyst layer 13. Alternatively, platinum fine particles or a film having a platinum fine structure may be deposited on the surface of the polymer electrolyte membrane 8 by a method such as sputtering, to thereby form the fuel electrode-side catalyst layer 11 and the oxidizer electrode-side catalyst layer 13.

As the material for the oxidizer electrode surrounding material 9, any material which has a sealing property and withstands a maximum temperature (about 120° C.) during operation of the fuel cell may be used. Preferred examples thereof include glass fiber cloth coated with polytetrafluoroethylene, fluorine rubber, and butadiene rubber. The thickness of the oxidizer electrode surrounding member 9 is determined so as to be substantially equal to the thickness of the oxidizer diffusion layer 14 and the oxidizer electrode-side catalyst layer 13 in the state in which the fastening force is applied. In the present embodiment, the material is butadiene rubber, and the thickness is 6 mm.

As shown in FIG. 2, a fuel cell 92 of Embodiment 1 is constructed of the fuel cell stack 1 and an external fuel tank 2 as a fuel supply source.

The external fuel tank 2 is a tank for storing hydrogen gas as a gaseous fuel and supplying the hydrogen gas to the fuel cell stack 1. The inside of the external fuel tank 2 is filled with a hydrogen storage alloy such as a titanium-iron-based alloy or a lanthanum-nickel-based alloy, or a hydrogen storage material such as carbon nanotube, graphite nanofiber, or carbon nanohorn. Those materials can store about several wt % of hydrogen at a pressure of 0.4 MPa.

In consideration of the volume of the fuel cell stack 1, the outer dimensions of the hydrogen tank 3 is made 25 mm×30 mm×10 mm. An aluminum alloy is used for the outer wall, and the wall thickness of the external fuel tank 2 is 1 mm. The weight of the external fuel tank 2 is about 15 g, and the volume of the external fuel tank 2 is 5.2 cm$^3$.

In the present first embodiment, a lanthanum-nickel-based alloy is used for the hydrogen storage material filled inside the external fuel tank 2. The energy stored in the external fuel tank 2 is about 7.0 [W·hr], and is about 2.5 times the energy of a conventional lithium ion battery having the same volume as the volume of the external fuel tank 2 and the fuel cell stack 1 combined.

In the present embodiment, the hydrogen gas taken out of the external fuel tank 2 is delivered to the fuel cell stack 1 through the nut 82 provided with the fuel flow path 83.

Next, a structure of a fuel flow path inside the fuel cell stack 1 is described. FIG. 3 is a cross-sectional view of the fuel electrode taken along dashed line 3 of FIG. 1. FIG. 4 is a cross-sectional view of the oxidizer electrode taken along dashed line 4 of FIG. 1.

As shown in FIG. 3, the through-holes 31a and 31b formed in the fuel electrode seal 7 are insertion holes of the stack fastening components 5 for fastening the fuel cell units 3.

The through-holes 31a positioned on one diagonal line of the fuel cell unit 3 serves as fuel flow paths and are in communication with the fuel electrode chamber 32 isolated from the atmosphere by the fuel electrode seal 7. The stack fastening component insertion parts 31b positioned on another diagonal line of the fuel cell unit 3 are isolated from the fuel electrode chamber 32 by the fuel electrode seal 7.

In the fuel electrode chamber 32 inside the fuel electrode seal 7, the fuel electrode-side catalyst layer 11 and the fuel diffusion layer 12 are disposed and stacked on the polymer electrolyte membrane 8 as described above. The hydrogen gas flowing from the through-holes 31a into the fuel electrode chamber 32 is supplied to the entire surface of the fuel electrode-side catalyst layer 11 through the fuel diffusion layer 12.

The hydrogen gas is separated into hydrogen ions and electrons by a catalytic action of the fuel electrode-side catalyst layer 11. The hydrogen ions move through the polymer electrolyte membrane 8 to the oxidizer electrode-side catalyst layer 13. The electrons are taken out of a negative electrode (upper separator 6 of FIG. 1) of the fuel cell stack 1 through adjacent fuel cell unit, flow through an external load, and move through a positive electrode (lower separator 6 of FIG. 1) of the fuel cell stack 1 and the oxidizer diffusion layer 14 to the oxidizer electrode-side catalyst layer 13.

In the oxidizer electrode-side catalyst layer 13, oxygen supplied from the oxidizer intake 10 through the oxidizer diffusion layer 14, the hydrogen ions, and the electrons react with each other to generate water molecules.

In the process described above, a part of the chemical energy of hydrogen molecules and oxygen molecules is extracted as electrical energy and is used in the external load.

As shown in FIG. 4, the through-holes 31a and 31b formed in the oxidizer electrode surrounding member 9 are insertion holes of the stack fastening components 5 for fastening the fuel cell units 3 and are isolated from the atmosphere by the oxidizer electrode surrounding member 9.

The insertion holes for the stack fastening components 5 are formed also at four corners of the separators 6.

The hydrogen gas as a gaseous fuel flowing through the end plate 4 on the external fuel tank 2 side moves inside the oxidizer electrode surrounding member 9 utilizing a gap between the stack fastening component 5 and the fastening component insertion part 31a as a flow path, and reaches the fuel electrode seal 7 of each of the fuel cell units 3 and enters the fuel electrode chamber 32. In this way, hydrogen can be supplied to all the fuel electrode chambers 32 of the fuel cell stack 1.

In the fuel cell 92 of Embodiment 1, the fuel cell stack fastening components 5 are inserted into the through-holes 31a and 31b disposed in the periphery of the fuel cell stack 1 and fasten the fuel cell stack. The gap between the stack fastening component 5 and the outer wall surface of the through-hole 31a serves also as a fuel flow path for guiding the gaseous fuel from the external fuel tank 2 to the fuel cell units 3. As a result, it is not required to provide an independent fuel supply path in the plane of the separator 6, so that the size of the fuel cell 92 can be reduced. Further, no separate member for forming a fuel supply path is required, so that the fuel cell 92 can be provided at low cost.

Embodiment 2

Figure 5:
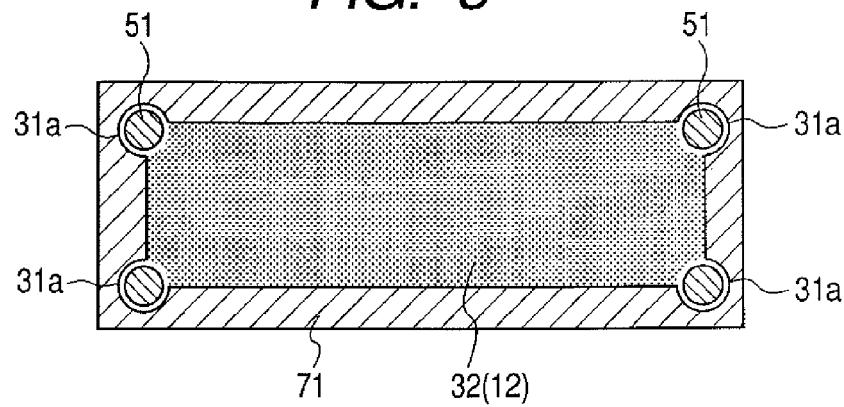
FIG. 5 is a schematic horizontal cross-sectional view of a fuel electrode of a fuel cell according to Embodiment 2 of the present invention.
Figure 6:
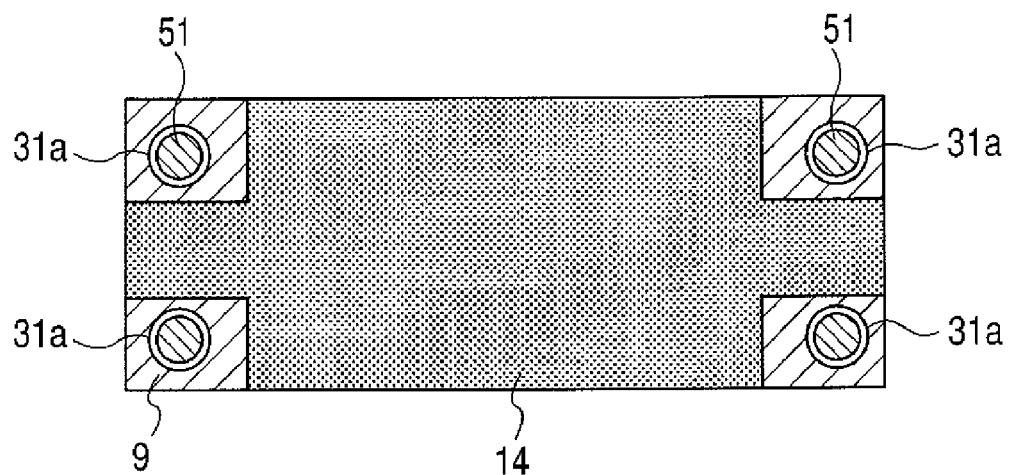
FIG. 6 is a schematic horizontal cross-sectional view of an oxidizer electrode of the fuel cell according to Embodiment 2 of the present invention.

FIG. 5 is a schematic cross-sectional view of a fuel electrode of a fuel cell according to Embodiment 2 of the present invention, and FIG. 6 is a schematic cross-sectional view of an oxidizer electrode of the fuel cell according to Embodiment 2 of the present invention. The fuel cell according to the present second embodiment is obtained by changing only the inner structure of the fuel cell according to the first embodiment, and has higher performance. In the fuel cell according to the present second embodiment, the fuel cell stack 1 is fastened by using stack fastening screws 51 each having an insulating layer formed on its surface. Other structures of the fuel cell according to the present second embodiment are the same as those of the fuel cell according to the first embodiment.

In a fuel electrode seal 71 (corresponding to the fuel electrode seal 7 of FIG. 2), the through-hole 31a communicating with the fuel electrode chamber 32 is formed at each of the four corners. The stack fastening screw 51 used is a screw subjected to screw cutting over its entire length and having a diameter of 4 mm and has an insulating layer formed on its surface to prevent short circuiting between the fuel electrode and the oxidizer electrode of the fuel cell unit 3. The stack fastening screw 51 is tightly inserted into the through-hole 31a worked to have an inner diameter of 4.1 mm.

Because the hydrogen gas as a gaseous fuel flows in a spiral manner through a flow path formed of a space between thread ridges of the stack fastening screw 51, the flow path will be assuredly formed even when the gap between the stack fastening screw 51 and the through-hole 31a is very small. Further, since the gap between the stack fastening screw 51 and the through-hole 31a is small, a function of aligning the components to be stacked can also be exerted, so that the fuel cell stack 1 can be assembled with high precision. As a result, the risk of leakage of hydrogen gas due to displacement of the stacked components is reduced, and a highly precise fuel cell stack 1 having high reliability can be obtained.

In the fuel cell according to the present second embodiment, the stack fastening component 51 has a mechanism of fastening with a screw. The fuel supply path corresponding to each fuel electrode chamber 32 is a gap formed between thread ridges of the stack fastening component 51 and the surface of the inner peripheral wall of the through-hole 31a. In this way, the fuel supply path is formed. Therefore, even when the gap between the inner peripheral wall surface of the through-hole 31a and the stack fastening component 51 is designed to be very small, the spiral space between thread ridges can be used as the fuel supply path. Thus, the stack fastening component 51 assuring the fuel supply path can be realized at low cost by using general-purpose screw components. Further, by engagement of the through-hole 31a and the stack fastening component 51, the components to be stacked can be easily aligned to each other. Thus, a fuel cell formed at high assembly precision can be provided at low cost.

In the fuel cell according to the present embodiment, the stack fastening component 51 and the through-hole 31a of the fuel cell unit 3 are electrically insulated. In this way, the probability at which the electrodes constituting the fuel cell stack 1 and the stack fastening components 51 come into contact with each other to cause short circuiting is drastically reduced, so that a fuel cell having high reliability can be realized.

Embodiment 3

Figure 7:
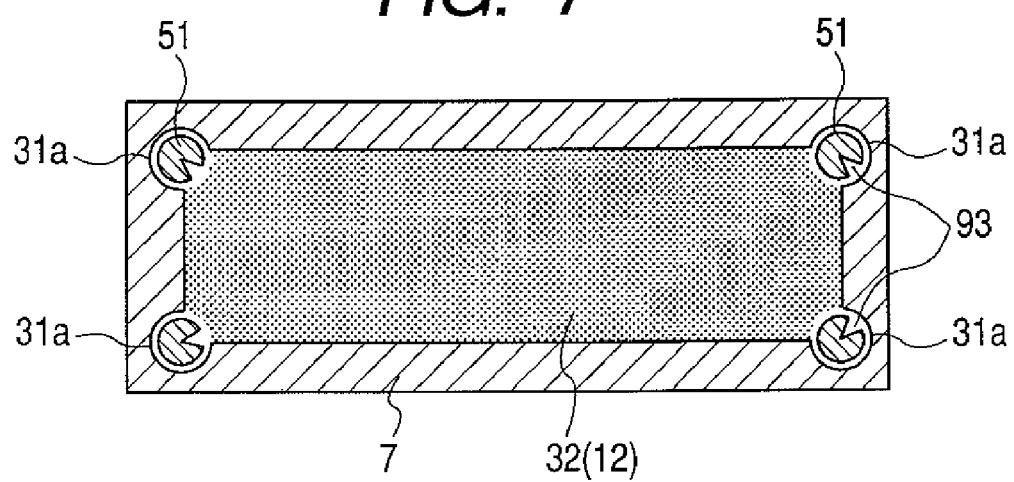
FIG. 7 is a schematic horizontal cross-sectional view of a fuel electrode of a fuel cell according to Embodiment 3 of the present invention.

FIG. 7 is a schematic horizontal cross-sectional view of a fuel electrode of a fuel cell according to Embodiment 3 of the present invention. The fuel cell according to the present third embodiment is obtained by changing only the inner structure of the fuel cell according to Embodiment 2, and has higher performance. In the fuel cell according to the present third embodiment, stack fastening screws 51 are used which each have an insulating layer formed on the surface thereof and each have a groove structure formed continuously in the axial direction thereof. Other structures are the same as those of the fuel cell of Embodiment 2. Therefore, structures common to those of FIGS. 2 to 4 are identified by the same reference symbols, and detailed descriptions thereof are omitted.

As shown in FIG. 7, in the present third embodiment, a notch 93 is provided in a part of the outer periphery of the stack fastening screw 51. The notch 93 is provided extending over the entire length of the screw. The shape of the notch is not particularly limited as long as it can be easily worked at low cost. In the present embodiment, a V-shaped groove having a cross-sectional shape of an isosceles triangle with a width of 0.5 mm and a depth of 0.8 mm is worked over the entire length of the screw.

As a result, the fuel cell according to the present third embodiment has an increased sectional area of the fuel supply path through the through-holes 31a as compared to that of Embodiment 2. Thus, a flow path resistance is reduced, and sufficient supply of the hydrogen gas is realized even when a large current is generated in the fuel cell stack 1.

The shape of the notch not necessarily needs to be uniform over the entire length of the screw, and the size of the notch may be varied depending on the corresponding fuel cell unit 3, to thereby adjust the flow path resistance of the fuel to each fuel cell unit 3. This can suppress the phenomenon that in the case where the fuel supply flow path resistance is uniform, the fuel supply becomes uneven between the upstream and the downstream, which results in variation in the amounts of power generation of the plurality of fuel cell units 3. Thus, the fuel cell 92 providing stable power can be realized.

Embodiment 4

In Embodiment 1, the fuel is flowed into the both of the pair of through-hole 31a. However, in the present fourth embodiment, one of the pair of through-holes 31a is allowed to serve as an inflow path, and the other through-hole 31a is allowed to serve as a discharge path.

A valve is provided at the nut 82 to be disposed in a position corresponding to the through-hole 31a on a discharge side and the valve is controlled to open only for discharge of impurities. As a result, gas stored in the fuel cell unit 3 at the time of starting power generation and impurity gas stored during the power generation can be pushed out by the introduced fuel gas, so that efficient power generation can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A fuel cell comprising:
fuel cell units each having disposed in a stacking direction a fuel supply space disposed on one side of a polymer electrolyte layer and isolated from the atmosphere, and an oxidizer supply space disposed on another side of the polymer electrolyte layer and communicating with the atmosphere;
a spacing holding member for supporting a thickness of the oxidizer supply space at a position outside a power generation region of the polymer electrolyte layer; and
at least one pair of through-holes, which penetrate the fuel cell from one end to another end in the stacking direction, which are isolated from the atmosphere, and which communicate with the fuel supply space, disposed at planar positions having the power generation region located therebetween,
wherein a fastening member is disposed in at least one through-hole of the pair of through-holes and has a thread ridge, and
wherein a groove structure is provided in the thread ridge continuously in an axial direction of the fastening member.

2. The fuel cell according to claim 1, wherein a fuel flow path extending from one through-hole to another through-hole of the pair of through-holes disposed with the power generation region therebetween is formed in the fuel supply space.

3. The fuel cell according to claim 1, wherein the spacing holding member is formed of an insulating material, and wherein the fastening member is formed of a metallic material, is disposed in contact with an inner wall surface of the through-hole in the spacing holding member, and has an insulating support structure for supporting a fastening force in an electrically insulated state on at least one end of the fastening member in the stacking direction.

* * * * *